United States Patent [19]

Sato

[11] Patent Number: 4,831,482
[45] Date of Patent: May 16, 1989

[54] ARRANGEMENT FOR PREVENTING DEFORMATION IN A TAPE CARTRIDGE

[75] Inventor: Akihiko Sato, Nagaokakyo, Japan

[73] Assignee: Hitachi Maxell, Ltd., Osaka, Japan

[21] Appl. No.: 53,016

[22] Filed: May 22, 1987

[30] Foreign Application Priority Data

May 22, 1986 [JP] Japan ................... 61-118284

[51] Int. Cl.$^4$ .............................. G11B 23/02
[52] U.S. Cl. ........................ 360/132; 242/199
[58] Field of Search ............... 360/132, 133; 242/199, 242/197–198; 206/444, 387

[56] References Cited

U.S. PATENT DOCUMENTS 4,687,157 8/1987 Schoettle ........................ 360/132
4,688,128 8/1987 Shiba ............................. 360/132

FOREIGN PATENT DOCUMENTS 52-38194  8/1977  Japan .
59-145782 9/1984  Japan .
59-145783 9/1984  Japan .
61-48478  4/1986  Japan .

Primary Examiner—A. J. Heinz
Attorney, Agent, or Firm—Birch, Stewart, Kolasch & Birch

[57] ABSTRACT

In a recording tape cartridge, a top case half and a bottom case half are combined through at least three combinations of a boss and a boss receiving hole two of which are disposed at the front or rear corners of the tape cartridge and one of which is disposed at the central portion of the side opposite to the side on which said two combinations are disposed so that the three combinations are in a triangular relation, whereby the mechanical strength of the cartridge case can be improved and the recording tape advance can be stabilized.

5 Claims, 3 Drawing Sheets

ARRANGEMENT FOR PREVENTING DEFORMATION IN A TAPE CARTRIDGE

BACKGROUND OF THE INVENTION

1. Field of the Invention

The present invention relates to a recording tape cartridge having a case body formed by a top case half and a bottom case half for accommodating a recording tape with a lid fitting manner, wherein the case body is arranged to improve the mechanical strength of the cartridge.

2. Description of the Prior Art

In a recording tape cartridge of the type mentioned above, the feed precision of the recording tape depends largely on the flatness of and the parallelity between the top and bottom case halves when the case halves are assembled. The assembling precision as well as the molding precision of the top and bottom case halves have a strong influence upon the improvement of the feed precision of the recording tape. Moreover, the mechanical strength of the case body upon completion should be improved in order to prevent a deformation thereof when it is subjected to an external force and to a high temperature environment. Particularly in case of a recording tape cartridge in which the recording tape is fed in the manner of reel-to-reel, that is, the recording tape is released from one tape reel to the front of the case body and taken up on another tape reel, the mechanical strength of the case body should be sufficiently strong to ensure against deformation because of the ease in which as case body becomes deformed in the horizontal longitudinal direction when used in a reel-to-reel manner.

Conventionally there have been proposed various techniques for preventing deformation of a case body as mentioned below.

First, Japanese Utility Model Publication (unexamined) No. 48478/1986 and Japanese Utility Model Publication (unexamined) No. 145783/1984 disclose to engage the screw bosses of the top and bottom case halves to the respective receiving means, in addition to engaging the halves by means of joining a cut recess and a projection formed on the butting surfaces of surrounding walls of the top and bottom case halves so as to prevent slipping between the top case half and bottom case half on the surrounding butting portion.

Second, Japanese Utility Model Publication (unexamined) No. 145782/1984 discloses that in order to prevent the slipping between the top and bottom case halves on the butting portion, there are formed projection members for preventing the shift of the butting surfaces of the top and bottom case halves caused by the deformation inside the butting surfaces of the top and bottom case halves whereby the resilient deformation can be reduced.

Further, there is an example of the recording tape cartridge such as disclosed in laid opened in Japanese Utility Model Publication No. 38194/1977, in which a high feed precision of the recording tape is required. In the above-mentioned recording tape cartridge a number of tracks are provided on the recording tape so that the width of the respective tracks is extremely narrow. Moreover, in the case of a tape dubbing operation, since the recording tape feed speed is set extremely high, the recording signal tends to drop out if the feed precision of the recording tape is low.

In the above-mentioned recording tape cartridge, the tape feed direction for recording is limited to one direction and there is defined an opening near the central portion in a rear peripheral wall of the cartridge case for discriminating the tape feed direction. Therefore, such an opening causes the cartridge case to be more easily deformed easier in the vertical direction as compared with a case body which does not have this opening.

In the case of a recording tape cartridge such as an audio tape cartridge of the Philips type or a digital audio tape cartridge, the interval between the screw bosses for fastening the top and bottom case halves in the rear peripheral portion of the case body is large and the butting member of the top and bottom case halves at the rear portion of the case body is limited to the rear peripheral wall of the case body, therefore, the case body is more easily deformed in the vertical direction or in the horizontal direction as compared with the video tape cartridge.

As described above, in the recording tape cartridge in which the deformation of the case body is prevented by the mechanical engagement structure such as the recess and projection formed on the peripheral walls of the top and bottom case halves for preventing the slipping movement of both the top and bottom case halves, the cartridge case can show an effective mechanical strength against only one deforming. In other words, there occurs a directionality in the effect of preventinmg deformation. For example, in the case of the recording tape cartridge with the groove and projection engagement on the butting surface of the rear peripheral walls of the top and bottom case halves (disclosed in the above-mentioned Japanese Utility Model Publication No. 145783/1084), the cartridge case has an effective mechanical strength against the deformation force applied in the vertical direction to the rear peripheral walls of the top and bottom case halves but has no effect on the external force such as a forth which causes the rear peripheral walls of the top and bottom case halves to slip back and forth.

As described above, there have been at once strength and weaknesses in the conventionmal techniques for preventing deformation of the tape cartridge case. Therefore, it has been difficult to sufficiently ensure the mechanical strength of the cartridge case and there has been a limit in the degree of improvement of the feed precision of the recording tape.

SUMMARY OF THE INVENTION

The main object of the present invention is to solve the above-mentioned. More particulary, the object of the present invention is to improve the mechanical strength of the cartridge case by improving the structure of the cartridge case, and to improve the feed precision of the recording tape by providing effective means for preventing the deformation of the case body in spite of the direction of the deformation force being applied to the cartridge case.

Another object of the present invention is to improve the working efficiency for assembling the case halves by facilitating the lid butting of the top and bottom case halves during the time when the top and bottom case halves is being assembled.

According to the present invention, there is provided a tape cartridge comprising a generally rectangular top case half having a pair of side walls, a front wall and a rear wall and a generally rectangular bottom case half having a pair of side walls, a front wall and a rear wall and which is assembled with the top case half through a plurality of engaging members to form a case body having two front corner portions and two rear corner portions having respective butting surfaces of the respective walls in contact with each other, each of the engaging members being a combination of a projecting boss and a boss receiving opening formed on the top case half and bottom case half, the improvement comprises at least two combinations of the boss and boss receiving opening provided at the front corner portions or rear corner portions of the case body, at least one combination of the boss and boss receiving opening provided at the front central portion or rear central portion of the case body, said two combinations and one combination of the boss and boss receiving opening being disposed to define a triangular relation, and at least one projecting member projected from one case half to the other case half near one of the boss receivinmg opening so that the projecting member extends toward said other case half beyond the butting surface of the top case half and bottom case half and, when the top case half and bottom case half are combined, the projecting member circumscribes the corresponding boss for preventing deformation of the case body.

The projection member may be projected up to the base portion of the correspondinmg boss when the top case half and bottom case half are combined.

The back surface of each of said projection members may be directed toward the center of the case body.

The projection members may circumscribe the circumference of the engaging boss at an angle range of more than 180° and on the other hand, said projection members formed at the both corner portions of the case body may circumscribe the engaging bosses at an angle range of less than 180°.

According to the present invention, the top case half and bottom case half are combined by at least three combinations of the boss and boss receiving opening which are disposed in a triangular relation, therefore the case body of the recording tape cartridge can improve the mechanical strength of the case body. Furthermore, since the bosses are circumscribed with the projection members, the engagement between the boss and boss receiving opening an be strengthened and therefore, even in case in which external deformation forces are applied to the case body from one direction or simultaneously from various directions, the recording tape cartridge according to the present invention can demonstrate a high mechanical strength against the external deformation forces, which would thereby result in the prevention of deformation of the case body.

Consequently, high precision and stability of the tape feed can be obtained. Moreover, since the projection members butted onto the engaging bosses before any other portions of the case body at the time of the assembling of the case body, positioning of the top and bottom case halves can be easily made, therefore, the work in connection with the assembling of the top case half and bottom case half can be facilitated and the working efficiency of assembling the case body can be improved.

DETAILED DESCRIPTION OF THE PREFERRED EMBODIMENTS

FIGS. 1 to 6 show the first embodiment of a data recorder to which a recording tape cartridge according to the present invention is applied.

In the above-mentioned recording tape cartridge, the feed direction of the recording tape is limited in one direction and twelve to seventeen tracks are set in maximum in the recording tape of 3.8 mm wide. In the case of copying a tape for a data back-up, the recording tape is fed at a maximum high speed of 90 inches per second.

Figure 1:
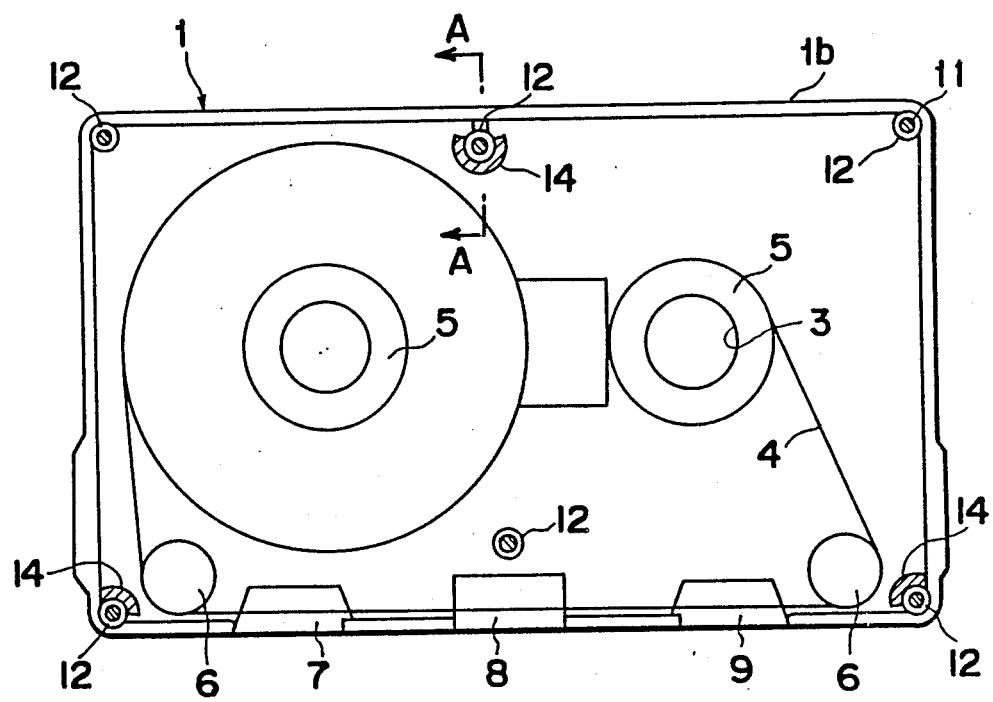
FIG. 1 is a plan view showing a general inner structure of a first embodiment of a recording tape cartridge according to the present invention.

The recording tape cartridge is fundamentally arranged the same way as the Philips type tape cartridge as shown in FIG. 1. Case body 1 of the recording tape cartridge is formed by assembling top case half 1a and bottom case half 1b both of which are made of plastic resin materials. There are defined driving shaft insertion holes 3,3 at both of the center portion with respect to the lateral direction or right and left side direction of the case body in the top and bottom case halves 1a and 1b, and hubs 5 for winding recording tape 4 are rotatably mounted around driving shaft insertion holes 3, 3 inside case body 1. There are disposed guide rollers 6 for defining the tape path in the right and left portion in the front portion of the case and there are opened pinch-roller insertion window 7, head insertion window 8 and erasing head insertion window 9 along the tape path between the two guide rollers 6. Recording tape 4 is released from one hub 5 and taken up to the other hub 5 through the tape path. Considering high tape feed speed, the head pad provided is not different from the recording tape cartridge of Philips type.

Figure 4:
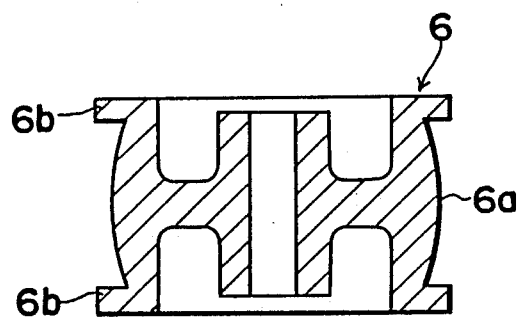
FIG. 4 is a cross sectional view of a guide roller.
Figure 5:
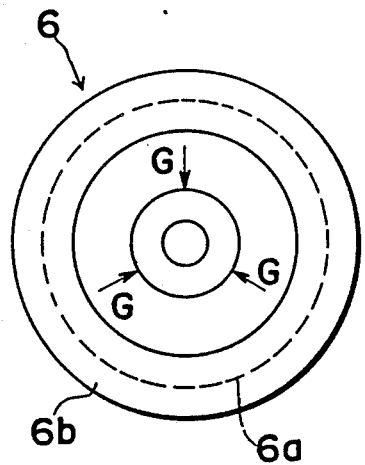
FIG. 5 is a plan view showing a guide roller.
Figure 6:
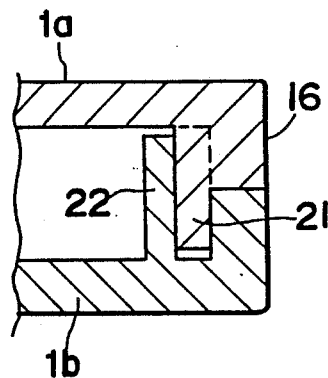
FIG. 6 is a cross sectional side view of a rear edge portion of a case body.

As shown in FIGS. 4 and 5, guide rollers 6 are made by molding the plastic resin materials in the manner such that cylindrical surface 6a of each guide roller 6 is formed in the shape of a taper crown and flanges 6b for defining the vertical movement of recording tape 4 are formed at the top and bottom end portions of cylindrical surface 6a so as to project generally perpendicular to cylindrical surface 6a. The reason why cylindrical surface 6a of guide roller 6 is formed in the shape of a taper crown is to ensure the stable feed of recording tape 4 in case the tape feed speed is set in a high speed.

Generally in case guide rollers 6 of the abovementioned shape are formed by injection molding, burrs frequently tend to be formed along the parting line, therefore, a stable feed of the recording tape can not be obtained unless these burrs are removed. Moreover, in the case of conventional molding in a high many production number of the molding articles to be produced is set and since the injection gate is limited to one position, sufficient precision with respect to the roundness and cylindricity of guide roller 6 and is difficult to obtain a swing of the roller tends to occur, thereby obstructing the stable tape feed. In the present invention, the injection molded guide roller 6 for obtaining the stable feed of the recording tape even when fed at a high feed speed of the tape, is obtained by decreasing the production number of the molding articles produced and by arranging the injection gates G at three positions near the end portion around the circumference of boss portion 6c as shown in FIG. 5. The reason why the cutting work is not adopted to form guide rollers 6 is that although guide rollers 6 of the above-mentioned shape can be formed with the necessary processing precision by adopting the cutting work, in this case the mass production ability of guide roller 6 is lowered and the production cost becomes high.

In the above-mentioned recording tape cartridge, in order to improve the mechanical strength of case body 1 and the feed precision of the recording tape, the top and bottom case halves 1a and 1b are fixed together in the butting manner as follows.

The top and bottom case halves 1a and 1b are fixedly combined together by fastening at six positions in both case halves 1a and 1b, that is, the four corners and the central portion near the tape path inside of head insertion window 8 in the front portion of case halves 1a and 1b and the central portion in the rear portion of case halves 1a and 1b by using engaging means 11 such as tap bolts.

Figure 2:
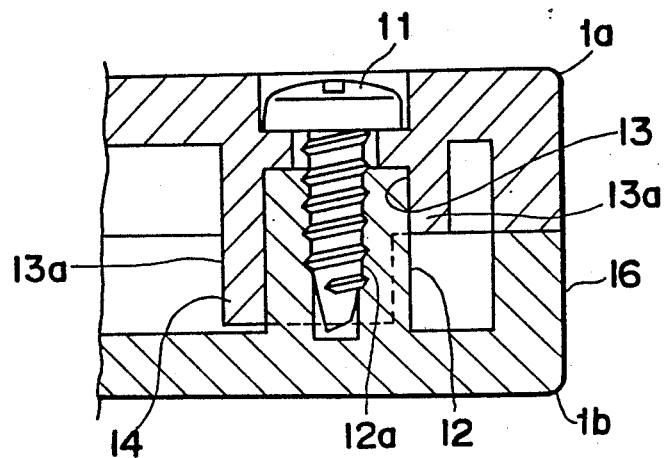
FIG. 2 is a partial enlarged cross sectional view taken along the lines A—A in FIG. 1.
Figure 3:
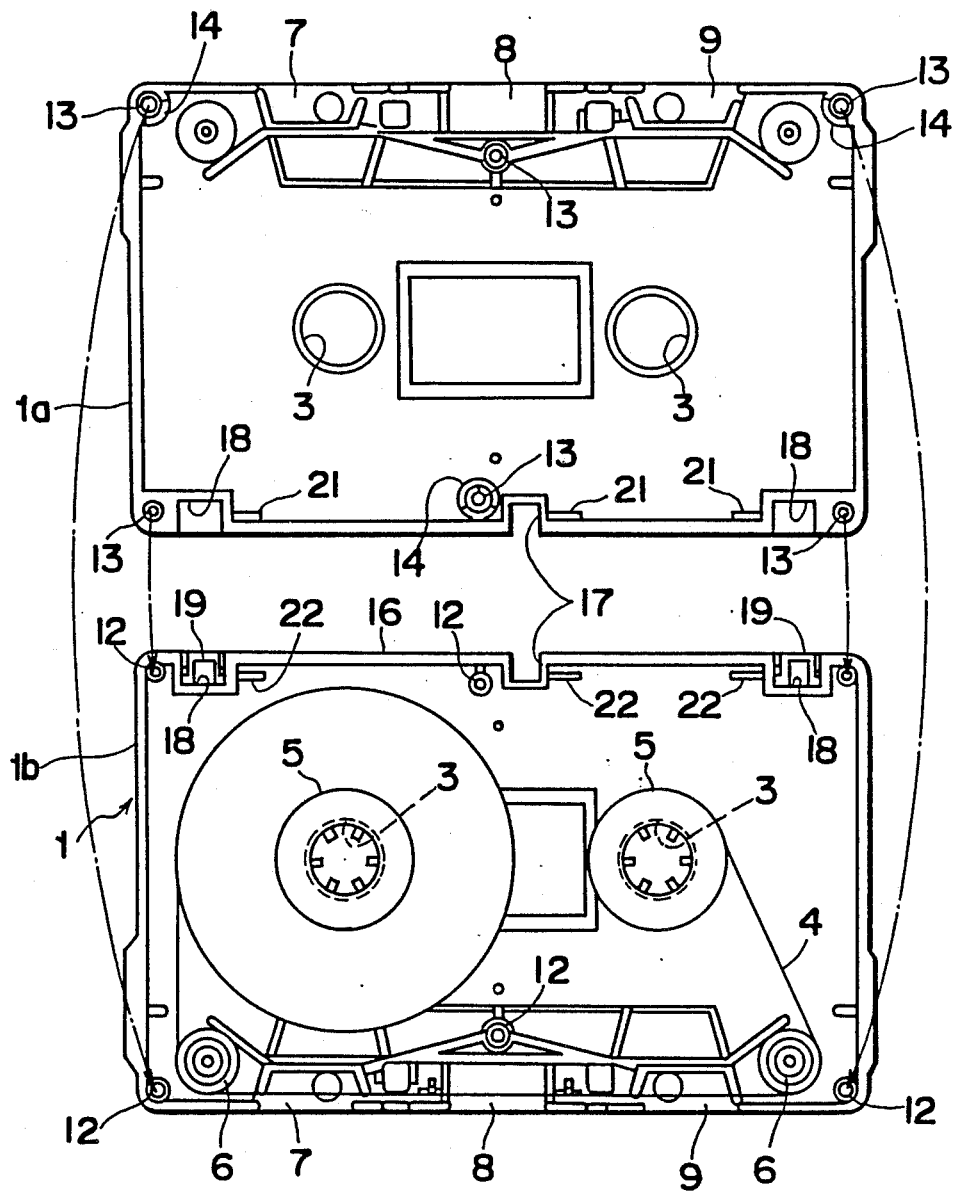
FIG. 3 is a plan view showing a top case half turned over and a bottom case half.

As shown in FIG. 2, engaging boss 12 in a cylindrical form having a screw hole are formed at the engaging positions of bottom case half 1b in such a manner that each boss is projected upward higher than the butting surface of the top and bottom case halves 1a and 1b. Inside top case half 1a there are formed annular member 13a having boss receiving holes 13 for inserting engaging boss 12. The tap bolt 11 is screwed into screw hole 12a of engaging boss 12 from the outer surface of top case half 1a under the condition of engaginmg engaging bosses 12 into boss holes 13, whereby top case half 1a and bottom case half 1b are fixed together in a butting manner. In order to fix both case halves 1a and 1b a screw or ultrasonic welding method may be used.

There are formed projection members 14 in an an arcuated shape extending from annular members 13a so as to conform to the part of the respective bosses 12 in order to prevent the deformation of the top and bottom case halves 1a and 1b at three positions, i.e., the central portion in the rear portion of case body 1 and both of the front lateral or right and left corners of case body 1, among the above-mentioned six engaging positions. Projection members 14 are formed with a partial arcuate shape so as to be in outer contact with the outer surfaces of engaging bosses 12 when the top and bottom case halves 1a and 1b are combined. In other words, projection members 14 are contacted to engaging bosses 12 under the condition of partially surrounding the peripheral surfaces of engaging bosses 12. Particularly, at the engaging position in the rear central portion of case body 1, projection member 14 is formed so as to be in outer contact with engaging boss 12 at a larger angle range of 240° than projection members 14, 14 in both of the right and left corners in the front of case body 1. Each of projection members 14 is so projected that the end portion of projection member 14 is opposed to the inside bottom wall of bottom case half 1b with a little space. Further, projection members 14, 14 on both corners in the front portion of the case halves are in outer contact with engaginmg bosses 12 at an angle range of 120°. Projection members 14 are formed so that the back surfaces of projection members 14 are faced to the center portion of case body 1.

There are defined rectangular discrimination openings 17 in the slightly right side portion from the center of rear peripheral walls 16 of the top and bottom case halves 1a and 1b in order to see and discriminate the signal recording direction of recording tape 4. Erase preventing rags 19 are formed so as to be folded and removed in closed chambers 18 on both of the right and left sides of rear peripheral walls 16 of the top and bottom case halves 1a and 1b.

There are vertically projected shift preventing ribs 21 respectively at the three positions on the inner surface of rear peripheral wall 16 of top case half 1a, in details two portions adjacent to closed chambers 18 and one position adjacent to the right side edge of discrimination opening 17 under the condition that shift preventing ribs 21 are projected from the butting surface of rear peripheral wall 16. Shift preventing walls 22 are projected upward from the inner bottom wall of bottom case half 1b at the portions corresponding to shift preventing ribs 21 so that shift preventing ribs 21 are disposed between shift preventing walls 22 and rear peripheral wall 16. The shift movement of rear peripheral wall 16 in the inside-to-outside direction is completely regulated by shift preventing members 21, 22. In a similar way to projection member 14, both of shift preventing members 21, 22 are projected so that the end portions of shift preventing members 21, 22 are respectively opposed to the inner bottom walls of the top and bottom case halves 1a and 1b with a small space. Thus in the above-mentioned arrangement, shift preventing ribs 21 and shift preventing walls 22, projection members 14 and engaging bosses 12, are engaged with each other before the engagement of any other components of the case halves at the time of assembling the top and bottom case halves 1a and 1b so that the positioning of top case half 1a and bottom case half 1b can easily be easily determined and therefore, the working efficiency of assembling the top and bottom case halves 1a and 1b can be improved. In addition, when a large deformation force is applied to case body 1, the end portions of projection members 14 and shift preventing members 21, 22 are abutted on the opposing portion of the inner bottom wall of case halves 1a and 1b so as to withstand the external force.

Figure 7:
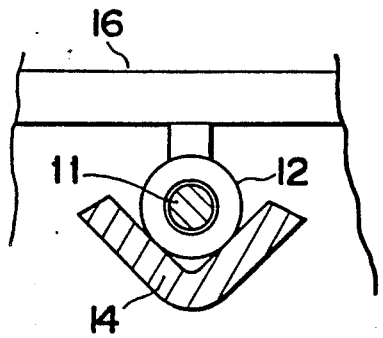
FIG. 7 is a cross sectional plan view of an essential part showing a second embodiment of a recording tape cartridge according to the present invention.

FIG. 7 is a transverse sectional plan view of the essential part showing a modification of projection member 14. In this case projection member 14 is formed with an L character shape so that projection member 14 circumscribes engaging boss 12 in two rectangular directions. The shape of projection member 14 is not limited to a partial arcuate shape, and various shapes of projection member 14 can be modified so that more than two continuously bent walls are formed so as to circumscribe engaging boss 12 in more than two portions. On the contrary, the shape of engaging boss 12 may be made rectangular or polygon so as to circumscribe projection member 14.

What is claimed is:

1. A tape cartridge comprising a generally rectangular top case half having a pair of side walls, a front wall and a rear wall and a generally rectangular bottom case half having a pair of side walls, a front wall and a rear wall assembled with said top case through a plurality of engaging members to form a case body said case body having two front corner portions and two rear corner portions with respective butting surfaces of said respective corresponding walls in contact with each other, each of said engaging members consisting of a combination of a projection member and a corresponding engaging member formed on said top case half and bottom case half respectively, wherein at least two combinations of said projection member and engaging member are provided at the front corner portions or rear corner portions of said case body, and at least one combination of said projection member and engaging member is provided at the front central portion or rear central portion of said case body, said respective combinations being disposed to define a triangular relation, said respective projection members having a partial arcuate shape projecting from one case half to the other case half around said corresponding engaging member such that said projection member extends beyond the butting surface of said top case half and bottom case half so as to partially circumscribe said corresponding engaging member thereby preventing deformation of said case body.

2. The tape cartridge according to claim 1, wherein said two combinations of projection members and engaging member are formed at the front corner portions of said cartridge case and said one combination of projection member and engaging member is formed at the rear center portion of said case body.

3. The tape cartridge according to claim 1, wherein each of said projection members projects to a base portion of said corresponding engaging member when said top case half and bottom case half are combined.

4. The tape cartridge according to claim 1, wherein each of said projection members forms a back surface which faces toward the center of said case body.

5. The tape cartridge according to claim 1, wherein said respective projection member formed at either the front or rear center portions of said case body circumscribes a circumference of said engaging member at an angle greater than 180° said projection members formed at the corner portions of said case body circumscribe said corresponding engaging members at an angle of less than 180°.

* * * * *